March 31, 1931.　　F. B. NEWELL ET AL　　1,798,216

ANEROID BAROMETER

Filed Oct. 15, 1927

INVENTORS:
Floyd B. Newell
Frederick W. Stalker
BY Alfred Burger
his ATTORNEY

Patented Mar. 31, 1931

1,798,216

UNITED STATES PATENT OFFICE

FLOYD B. NEWELL AND FREDERICK W. STALKER, OF ROCHESTER, NEW YORK, ASSIGNORS TO TAYLOR INSTRUMENT COMPANIES, OF ROCHESTER, NEW YORK, A CORPORATION OF NEW YORK

ANEROID BAROMETER

Application filed October 15, 1927. Serial No. 226,463.

This invention relates to barometers of the aneroid type and more in particular to an instrument for measuring altitudes.

The aneroid barometer type of instrument is generally well adapted for aviation purposes, but it was found that certain mechanical characteristics constituted a serious drawback in connection with the problems and the exigencies of aeronautics.

In the course of extended investigations we found that the undesirable property of what may be called "hysteresis" may be materially counteracted and diminished by symmetrically supporting the mainspring relatively to the principal axes of the spring.

Figure 1:
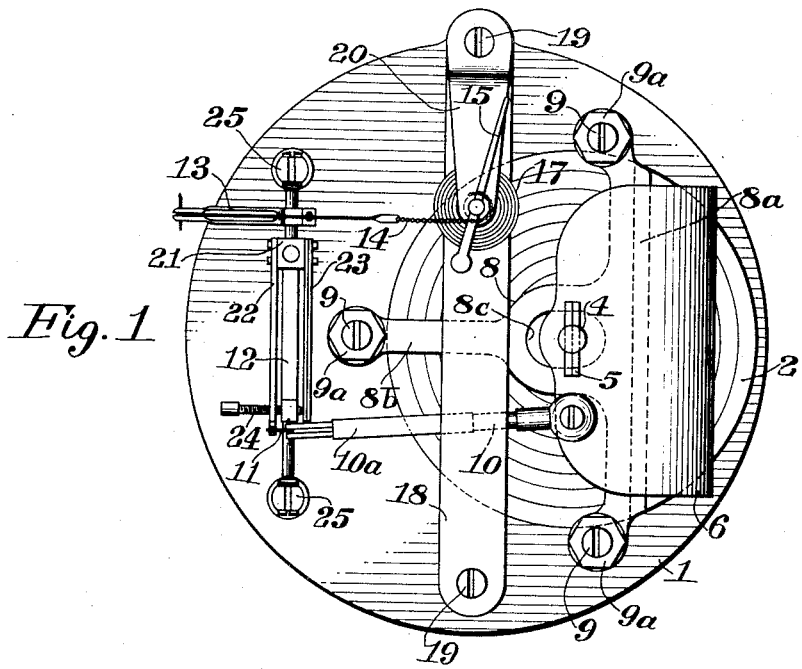
Figure 2:
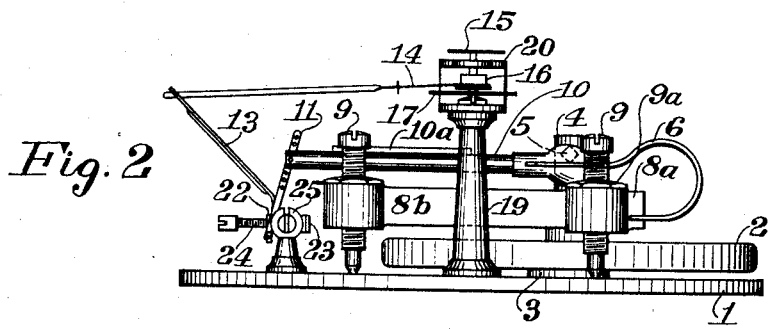

For a full understanding of the invention, the principles of operation upon which it is based and the advantages attained, reference is made to the accompanying drawings, wherein Fig. 1 is a plan view of a mechanism embodying the invention; and Fig. 2 is a side view thereof.

In the drawings 1 is a supporting disk to which is secured the vacuum chamber 2 by means of the usual stud connection 3. From the opposite wall of the vacuum chamber rises the usual stud 4 connected by means of a knife edge member 5 to the mainspring 6. The parts so far described and their relation represent one well known arrangement of the prior art.

The invention is identified with the specific arrangement for supporting the mainspring 6 upon the supporting disk 1. The means for supporting the spring 6 comprises a T-shaped carriage including the transverse arm 8a and the shank 8b extending centrally from and at right angle to the transverse arm 8a. Near its inner end or line of junction with the arm 8a the shank 8b is widened to provide for a central opening 8c to allow the stud 4 to pass upwardly for its connection with the upper or outer leg of the U-shaped mainspring 6.

The T-shaped member is provided at its extremeties with adjusting screws 9 adapted to be locked in adjusted position by means of lock nuts 9a. The screws 9 have pointed ends normally bearing upon the disk 1 and preferably take in depressions formed therein.

The lower leg of spring 6 is attached at its free end to the outer face of the transverse arm 8a of the carriage and the upper leg which is considerably longer than the lower leg, extends well beyond the inner face of the transverse arm so that the pressure reaction between the spring 6 and the carriage holds the latter firmly against the disk 1 at the three points of support.

The spring 6 carries an arm 10 connected by means of a link 11 to a shaft 12 which, in turn carries a crank arm 13 connected by means of a fine chain 14 or the like with the pointer 15 mounted on a drum on which the chain is wound under the action of a hair spring 17.

The drum and spring 17 are mounted between a bridge 18 supported by means of studs 19 upon disk 1 and a plate 20 secured to the bridge.

The arm 10 which may be of brass, includes a strip 10a of invar steel or the like to function as a bimetallic arm.

On the shaft 12 which is supported in bearings 25 are mounted by means of a coupling 21 or in any other way two strips 22 and 23 extending on opposite sides of the shaft and substantially parallel thereto. The strip 22, which may be of any metal having suitable resilient property, carries a set screw 24 which extends through a bore in shaft 12 and may be adjusted to bear against the strip 23 to force it out of its normal position of rest away from the shaft. The strip 23 is composed of two metals forming a bimetallic strip of usual type.

The arm 11 is connected to the free end of the strip 22.

The functional significance of the apparatus is as follows:

The main spring 6 is always under tension tending to move outwardly or away from the vacuum chamber. The resistance of the vacuum chamber, or rather of the resilient walls thereof, opposing the movement of the spring varies with the atmospheric pressure, decreasing in proportion as the atmospheric pressure decreases, as is the case in all aneroid barometers of this type.

By means of the T-shaped carriage, which represents what we consider as the preferred embodiment of this invention torsional movement of the spring is practically avoided or at least largely minimized. Motion about an axis passing through the shank 8b is prevented by the two supports at the ends of the transverse arm 8a while motion about an axis passing through the supports at the end of the transverse arm 8a is prevented by the support at the end of the shank 8b. The parts of the carriage including the supports 9 are symmetrically disposed relatively to the spring and its principal axes.

It is understood that a T-shaped carriage, while it has special advantages, is not absolutely essential as such. Any frame which extends symmetrically from the bar to a point on the median perpendicular to the bar, forwardly of the free edge of the longer leg of the main spring may be made use of.

We claim:

1. In aneroid barometers, the combination with a vacuum chamber, a support connected to one side thereof, a stud extending from the other side thereof and a U-shaped spring having legs of different lengths, the outer longer leg being connected near its free edge to the stud, of means for supporting the inner shorter leg, comprising a bar substantially coextensive with and connected to the end portion of the shorter leg, a frame rigidly connected with the bar and extending symmetrically therefrom to a point on the median perpendicular to the bar, forwardly of the free edge of the longer leg and supporting screws at the opposite ends of the bar and at said point for adjustably supporting the bar and frame.

2. In aneroid barometers, the combination with a vacuum chamber, a support connected to one side thereof, a stud extending from the opposite side thereof and a U-shaped spring having legs of different lengths, the outer longer leg being connected near its free edge to said stud, and means for supporting the inner shorter leg, comprising a substantially T-shaped member the cross bar of which is connected with the end portion of the shorter leg and the shank of which is disposed in a plane passing through the said stud, said T-shaped member having an opening for the stud to pass through.

In testimony whereof we affix our signatures.

FLOYD B. NEWELL.
FREDERICK W. STALKER.